(12) United States Patent
Meiri et al.

(10) Patent No.: US 7,383,385 B2
(45) Date of Patent: *Jun. 3, 2008

(54) REMOTE MIRRORING IN A SWITCHED ENVIRONMENT

(75) Inventors: David Meiri, Boston, MA (US); Dan Arnon, Boston, MA (US); Mark J. Halstead, Waltham, MA (US); Peter Kamvysselisi, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/627,000

(22) Filed: Jan. 25, 2007

(65) Prior Publication Data

US 2007/0198668 A1 Aug. 23, 2007

Related U.S. Application Data

(63) Continuation of application No. 11/183,461, filed on Jul. 18, 2005, now Pat. No. 7,174,423, which is a continuation of application No. 09/767,773, filed on Jan. 23, 2001, now Pat. No. 6,938,122.

(51) Int. Cl.
*G06F 13/14* (2006.01)

(52) U.S. Cl. ...................... 711/114; 709/218

(58) Field of Classification Search ........... 711/114, 711/154, 165; 709/218, 219
See application file for complete search history.

(56) References Cited

U.S. PATENT DOCUMENTS

| 5,680,580 A | 10/1997 | Beardsley et al. |
| 5,938,732 A | 8/1999 | Lim et al. |
| 6,070,191 A | 5/2000 | Narendran et al. |

(Continued)

FOREIGN PATENT DOCUMENTS

JP 7-234811 9/1995

(Continued)

OTHER PUBLICATIONS

International Search Report of PCT Application No. PCT/US01/45082 (PCT/ISA/220) mailed Dec. 10, 2002.

*Primary Examiner*—Kevin L Ellis
(74) *Attorney, Agent, or Firm*—Daly, Crowley, Mofford & Durkee, LLP

(57) ABSTRACT

A mechanism to support remote mirroring of storage devices by data storage systems in a one-to-many switched environment. Each data storage system includes a disk director that is adapted to control at least one device group that is supported in a mirrored configuration with a corresponding device group controlled by one of the other data storage systems. For each device group and corresponding device group, there are first ports associated with the device group and second ports associated with the corresponding device group. A switch element is adapted to connect one of the first ports to at least one of the second ports so that data may be exchanged between the ports for each device group and corresponding device group. The disk director selects which first port is to be connected to which second port via the switch element in the establishment of a logical link. Thus, each port connected to the switch is capable of achieving multiple connections to multiple destinations for increased connectivity, redundancy and performance (load balance) without additional hardware.

14 Claims, 8 Drawing Sheets

U.S. PATENT DOCUMENTS 6,421,711 B1  7/2002  Blumenau et al.
6,549,988 B1  4/2003  Gertner
6,618,818 B1  9/2003  Wahl et al.
6,836,830 B1  12/2004  Yamagami et al.

FOREIGN PATENT DOCUMENTS

| | | |
|---|---|---|
| JP | 2000-242434 | 9/2000 |
| JP | 2000-305856 | 11/2000 |
| JP | 2000-132343 | 12/2000 |
| JP | 2000-347811 | 12/2000 |
| JP | 2001-014261 | 1/2001 |
| WO | WO99/34291 | 7/1999 |

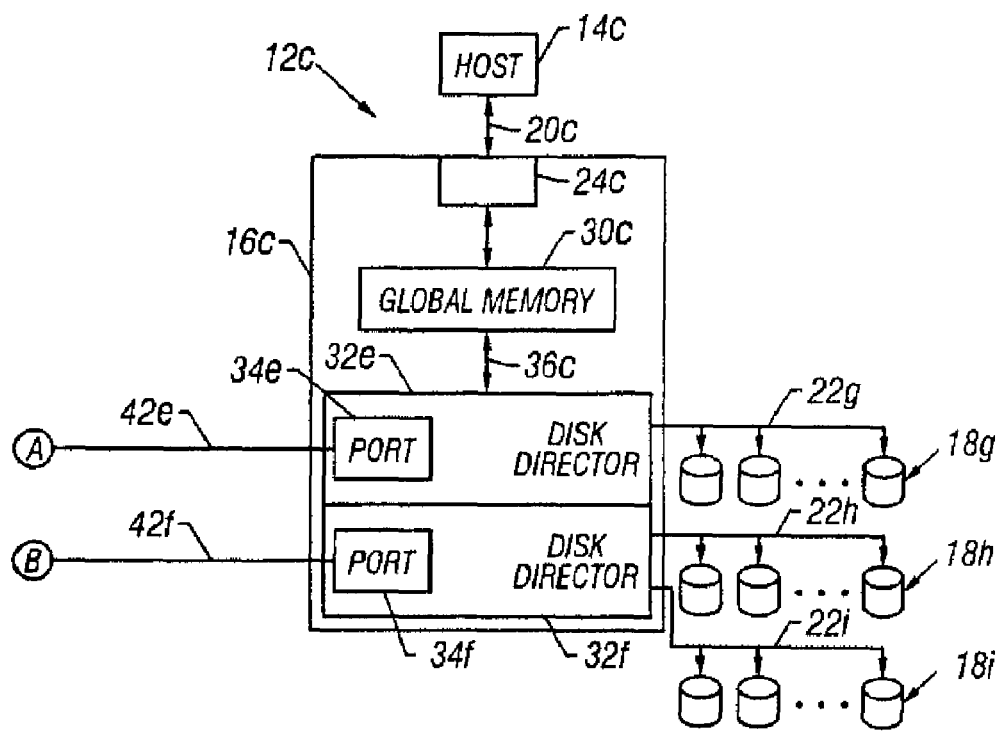
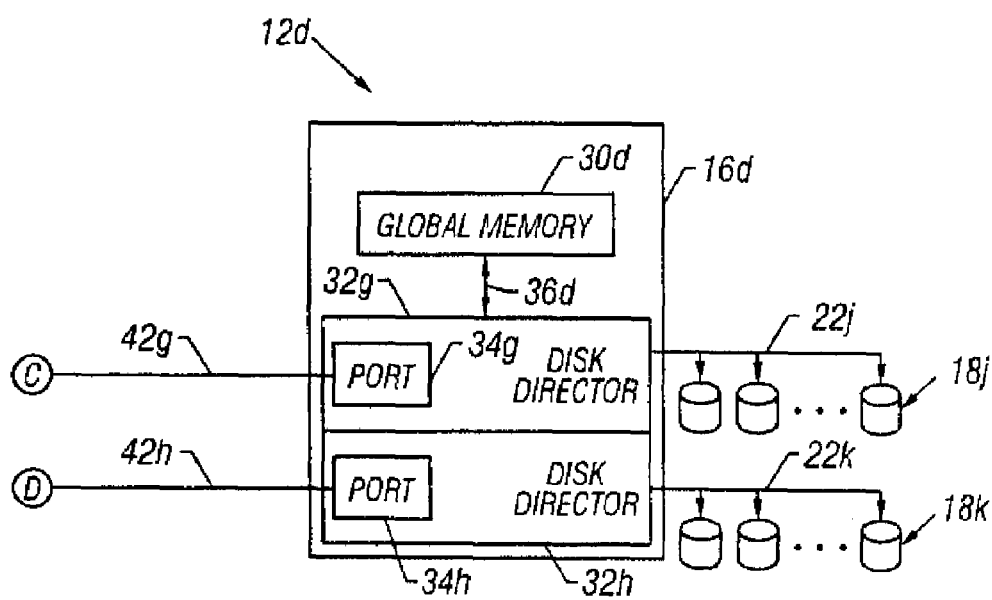
FIG. 1B

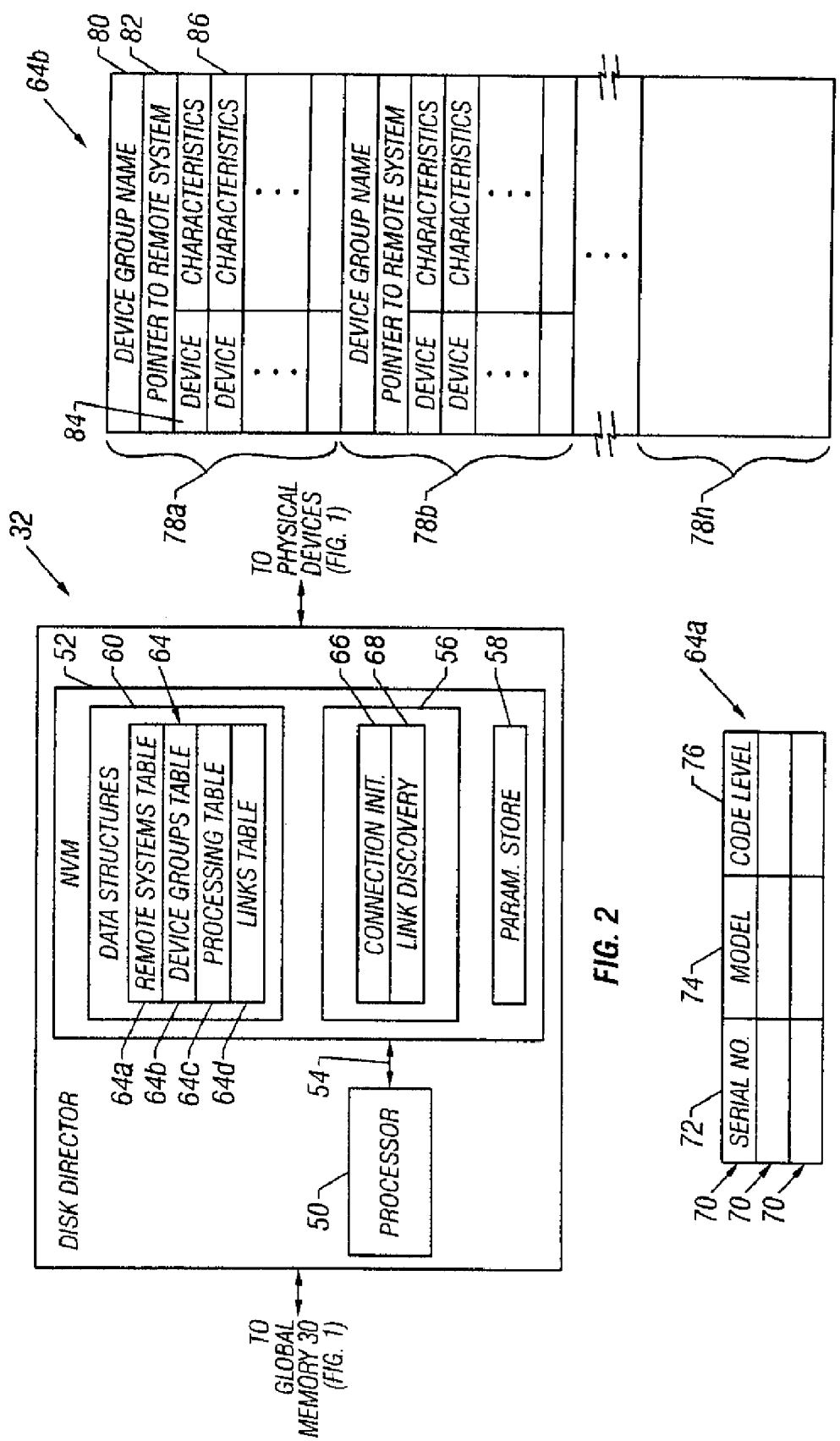

REMOTE MIRRORING IN A SWITCHED ENVIRONMENT

CROSS REFERENCE TO RELATED APPLICATIONS

This application is a continuation of U.S. patent application Ser. No. 11/183,461 filed Jul. 18, 2005, which issued on Feb. 6, 2007 as U.S. Pat. No. 7,174,423 which is a continuation of U.S. patent application No. 09/767,773 filed Jan. 23, 2001, which issued on Aug. 30, 2005 as U.S. Pat. No. 6,938,122.

BACKGROUND OF THE INVENTION

The invention relates to data storage systems, and in particular, to data storage systems with remote data mirroring capability.

Given the importance of the availability of information, several techniques have been developed for providing enhanced reliability and availability of data stored in a data storage system. Once such technique is data mirroring. In a "mirrored" system, the data stored on one data storage system is replicated on another data storage system. Thus, if one or more storage devices on one of the data storage systems fails, or a catastrophic system failure should occur, the data is readily available in the form of a mirrored copy from the mirrored data storage system.

Devices on a data storage system (or source) that are mirrored on the same remote, data storage system (or target) are referred to as a device group. Likewise, devices on the target that serve or mirror devices on the same source are referred to as a device group. Device groups are used, for example, to insure the consistency of blocks of data too large to be stored in a single area, during planned or unplanned interruptions such as link failures or planned back-ups. Device groups typically span a number of physical and logical volumes, and, in some instances, as when data striping is used, several device groups may be mapped to different portions of a physical or logical volume.

Typically, the source and target device groups are arranged as pairs on any two systems and each source/target device group pair is connected by two dedicated links (e.g., ESCON or Fibre Channel links), one for supporting writes during data backup operations and reads during data recovery operations, and the other for redundancy. Thus, a redundant arrangement of N data storage systems in which each data storage system is capable of supporting a mirrored configuration involving each of the N−1 other remote data storage systems requires N*(N−1) physical links, or an average of 2*(N−1) physical links per system. This link requirement becomes impractical when N>3, as the number of ports on the data storage system is limited.

SUMMARY OF THE INVENTION

In one aspect of the invention, in a remote data mirroring arrangement of data storage systems, ports on a data storage system are connected to ports on other data storage systems. Each storage system is provided with configuration topology information. From a switch fabric that connects to ports of all of the data storage systems information identifying ports of the other data storage systems connected to the switch fabric is determined. The configuration topology information and the information obtained from the switch fabric are used to establish a logical link between a port on the storage system and a second port on a second storage system so that data residing on a device group supported by the port and a corresponding, mirrored device group supported by the second port can be exchanged between the data storage system and the second data storage system.

In another aspect of the invention, a system includes an arrangement of storage systems each adapted to control at least one group of devices that are supported in a mirrored configuration with a corresponding group of devices controlled by one of the other storage systems. For each device group and corresponding device group, first ports are associated with the device group and second ports are associated with the corresponding device group. The system further includes a switch element adapted to connect one of the first ports to at least one of the second ports so that data may be exchanged between the first and second ports for each device group and corresponding device group.

In yet another aspect of the invention, in a remote, mirrored arrangement of data storage systems, a data storage system includes a port adapted to control at least one device group and a switch element coupled to the port and ports in the other storage systems. The port uses the switch element to link the port to a selected one of the ports controlling a second device group that mirrors the device group controlled by the port.

The advantages of the invention include the following. The replacement of a dedicated one-to-one protocol such as ESCON with a switched protocol reduces the required number of ports from 2(N−1) to 2. Such increased connectivity provides for better performance (e.g., load balance) as well as increased redundancy. Also, because each processor on a controller of a data storage system is able to service multiple device groups, a system user can use full remote data mirroring connectivity without having to dedicate processors to supporting that connectivity.

Other features and advantages of the invention will be apparent from the following detailed description and from the claims.

BRIEF DESCRIPTION OF THE DRAWINGS

FIG. 1 is a block diagram of a system comprised of FIGS. 1A and 1B.

FIG. 1B is a second portion of a block diagram of the system of FIG. 1 that includes data storage systems having remote data minoring capability relative to each other and that are connected to a Fibre Channel (FC) switch fabric.

FIG. 2 is a detailed block diagram of a disk director used to establish logical link connections over the switch fabric for an FC port.

FIGS. 3A-3D are illustrations of configuration topology tables. FIG. 3A is an illustration of a remote systems table. FIG. 3B is an illustration of a device groups table. FIG. 3C is an illustration of a disk directors table. FIG. 3D is an illustration of a logical links table.

DETAILED DESCRIPTION

The present invention features a system environment in which data identical to that stored on a data storage system is stored on a geographically remote data storage system. The remote data storage system is used to backup data stored on the data storage system and provide data recovery when the data storage system and its data are lost as a result of malfunction or disaster.

Figure 1A:
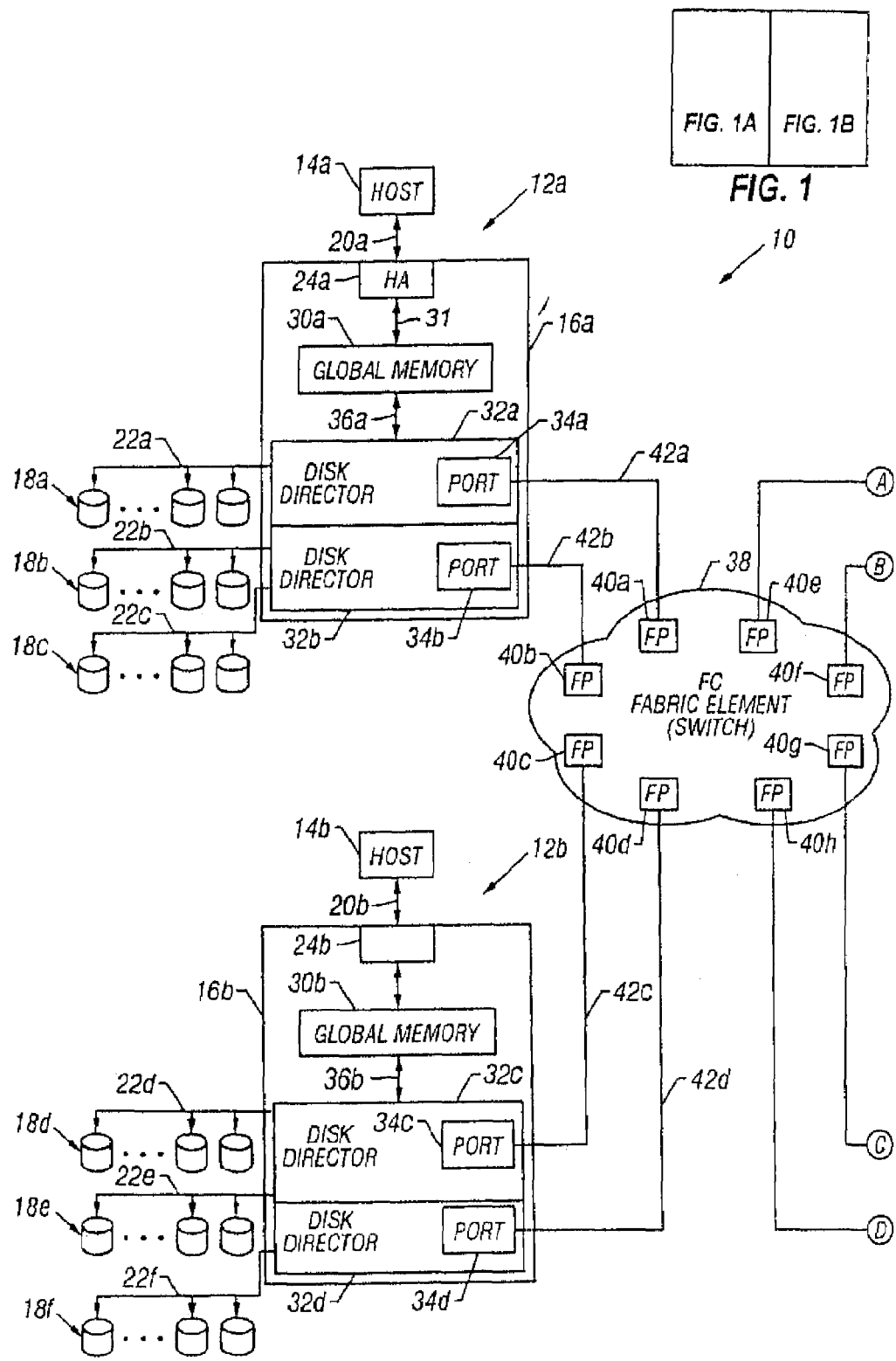
FIG. 1A is a first portion of a block diagram of the system of FIG. 1 that includes data storage systems having remote data minoring capability relative to each other and that are connected to a Fibre Channel (FC) switch fabric.

Referring to FIGS. 1, 1A and 1B. a system 10 includes data storage systems 12a, 12b, 12c and 12d. The data storage systems 12a, 12b and 12c are connected to at least one host computer (or host) 14a, 14b and 14c, respectively. The host computer 14 may be, for example, a personal computer, workstation, or the like which may be used by a single user, or a multi-user system. The data system 12 receives data and commands from, and delivers data and responses to, the host computer 14.

The data storage systems 12a-12d are mass storage systems having respective controllers 16a-16d, each of which is coupled to pluralities of storage devices (or, simply, devices) shown as disks 18. The controller 16a is coupled to devices 18a, devices 18b and devices 18c. The controller 16b is coupled to devices 18d, devices 18e and devices 18f. The controller 16c is connected to devices 18g, devices 18h and devices 18i. The controller 16d is coupled to devices 18j and devices 18k. Each of the devices 18 is logically divided, in accordance with known techniques, into one or more logical volumes.

Each controller 16 interconnects the host computer 14 and the devices 18, and can be, for example, that made by EMC and known as the Symmetrix controller. The controllers 16a-16c receive memory write commands from respective host computers 14 directly from host buses 20a-20c, respectively, for example, connected and operated in accordance with a SCSI protocol, and deliver the data associated with those commands to the appropriate devices 18 over connecting buses 22a, 22b, . . . 22k. Buses 22 also preferably operate in accordance with a SCSI protocol. The controllers 16a-16c also receive read requests from the host computer 14 over host bus 20, and deliver requested data to the host computer 14, either from a cache memory of the controller 16 or, if the data is not available in cache memory, from the devices 18.

In a typical configuration, the controller 16 also connects to a service management console (not shown), which is used for maintenance and access to the controller 16 and can be employed to set parameters of the controller 16 as is well known in the art.

Typically, and as indicated above, each of the devices 18 is configured to store logical volumes (or devices). There can be a plurality of logical volumes, for example 4, 8, or more logical volumes, on a physical device. In a configuration in which multiple copies of a logical volume are maintained, that is, in particular, where two copies of data are separately stored for a logical volume, it is said that mirrors are maintained. (There could be more than two mirrored copies. Typically, however, mirrored pairs are employed.) The controller 16 can then respond to a read request by reading from either of the copies stored in the storage devices 18. Mirroring may exist at both the logical volume and physical device level, or at the logical volume level only. Data mirroring configurations can occur on the same controller, or on different controllers, as in the case of remote data mirroring (or remote data facility, ORDF).

In operation, the host computer 14 sends, as required by the applications it is running, commands to the data storage system 12 requesting data stored in the logical volumes or providing data to be written to the logical volumes. Still referring to FIGS. 1, 1A and 1B the controllers 16a-16c include host adapters 24a-24c for facilitating communications with the host computers 14a-c, respectively. The host computer 14 typically connects to a port of the host adapter 24 over the SCSI host bus line 20.

The controllers 16a-16d each further include a global memory 30, shown as global memories 30a-30d, respectively. The host adapter 24 in each controller connects over at least one system bus 31 to the global memory 30. Also connected to the global memory system 30 in each of the controllers 16 are disk directors 32, more specifically, disk directors 32a-32b in the controller 16a, disk directors 32c-32d in the controller 16b, disk directors 32e-32f in the controller 16c and disk directors 32g-32h in the controller 16d. The disk directors 32 communicates with the host adapter 24 through the global memory 30. Although not shown, the global memory 30 can include a cache memory for storing data, as well as various data structures for maintaining control information and for supporting communications between the hosts 14 and the devices 18.

The disk directors 32 control the storage devices 18. Each of the disk directors 32a-32h includes a respective one of ports 34a-34h, respectively. In the described embodiment, the disk directors 32 are installed in the controller 16 in pairs. Thus, only two disk directors in each of the controllers 16 are shown. However, it will be understood that additional disk directors may be employed by the system 10.

The disk directors in the controllers 16a-16d communicate with the respective global memories 30a-d over dedicated buses 36a-36d, respectively. During a write operation, the disk director 32 reads data stored in the global memory 30 by the host adapter 24 and writes that data to the appropriate logical volumes. During a read operation and in response to a read command, the disk director 32 reads data from a logical volume and writes that data to the global memory 30 for later delivery by the host adapter 24 to the requesting host 14.

In the system 10 of FIGS. 1, 1A and 1B each of controllers 16 is connected to a switch fabric 38. The switch fabric 38 includes a plurality of fabric ports (FP) 40, shown as FP 40a, FP 40b, FP 40c, FP 40c, FP 40d, FP 40e, EP 40f, FP 40g and FP 40h. Each port in each disk director is connected to a different one of the fabric ports 40. As shown, ports 34a-34h are coupled to the fabric ports 40a-h, respectively, over connections or links 42a-42h, respectively. The switch fabric allows each of the controllers 12 to be connected to other controllers 12 when the others controllers are serving as remote data storage systems that provide backup capability in the form of minored storage for the data stored in the data storage system 12. With respect to any given one of the controllers 16, a "remote" controller or system will be any other controller 16 that maintains mirrored copies of data stored on that given controller 16 or stores data for which the given controller 16 itself maintains mirrored copies. Thus, any controller 16 and another controller that is a remote controller (and thus provides RDF frmnctionality with respect to that controller) are said to be in a mirrored configuration or arrangement. Remote data mirroring facility and recovery procedures may be performed using known techniques, such as those described in the above-referenced U.S. Pat. No. 5,742,792.

In the described embodiment, the switch fabric 38 is a Fibre-Channel fabric. However, other one-to-many switch protocols, e.g., Gigabit Ethernet, can be used.

Other system implementations are contemplated. For example, it will be understood that the data storage systems 12 need not be limited to one host computer as shown. For instance the data storage system 12 could be coupled to more than one host computer. Alternatively, and as is illustrated with the data storage system 12*d*, the data storage system 12 need not be coupled to a host device at all. Such a system data storage system may be used only to perform writes in connection with write requests received from one of the other data storage systems 12*a-c* so that updated information stored by the host adapter on that other data storage system is also stored on the remote data storage system 12*d*, thereby maintaining the information stored in the other data storage system, e.g., data storage system 12*a*, in a mirrored condition on the remote data storage system 12*d*. Also, the host adapter 24 can include a plurality of host adapters, each supporting a different host bus/host computer. There could be more or few than the four data storage systems shown in FIGS. 1, 1A and 1B. There could be more than two ports per data storage system.

Referring to FIG. 2, each disk director 32 includes a processor 50 coupled to a local, nonvolatile memory (NVM) 52 by an internal bus 54. The processor 50 controls the overall operations of the disk director 32 and communications with the local memory 52. The nonvolatile memory 52 stores firmware 56 and parameter data in a parameter store 58. Also included in the local memory 52 are various data structures 60, i.e., configuration topology tables 64, which maintain configuration information for the disk director 32 as well as the system 10. The tables 64 include a remote systems table 64*a*, a device groups table 64*b*, a directors (or processors) table 64*c* and a logical links table 64*d*. The functionality of these data structures will be described later.

Still referring to FIG. 2, the firmware 56 includes a number of processes executed by the processor 50 to control data transfer between the host computer 14 (if present), the global memory 32 and the storage devices 18. In addition, the firmware 56 requires processes to control communications between the port 34 and ports in other controllers via the switch 38. To that end, the firmware 68 is adapted to include a connection initialization process 66 and a single link discovery process 68, as will be described. The firmware 56, data structures 60 and parameter store 58 are read each time the data storage system is initialized. The firmware 56 is copied to the volatile memory 52 at initialization time for subsequent execution by the processor 50.

Figure 3C:
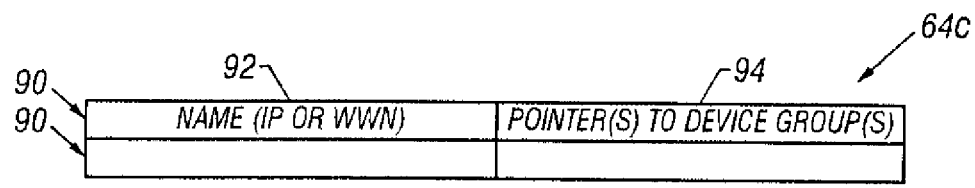

The various configuration topology tables 64 are illustrated in FIGS. 3A-3D. Referring to FIG. 3A, a remote systems table 64*a* includes an entry 70 for each controller/data storage system that is involved in a mirrored arrangement with the data storage system. Each entry 70 includes a controller (system) serial number 72; a controller (system) model number 74; and a firmware (code) level identifier 76. Other system-specific information can be included as well.

Figure 3D:
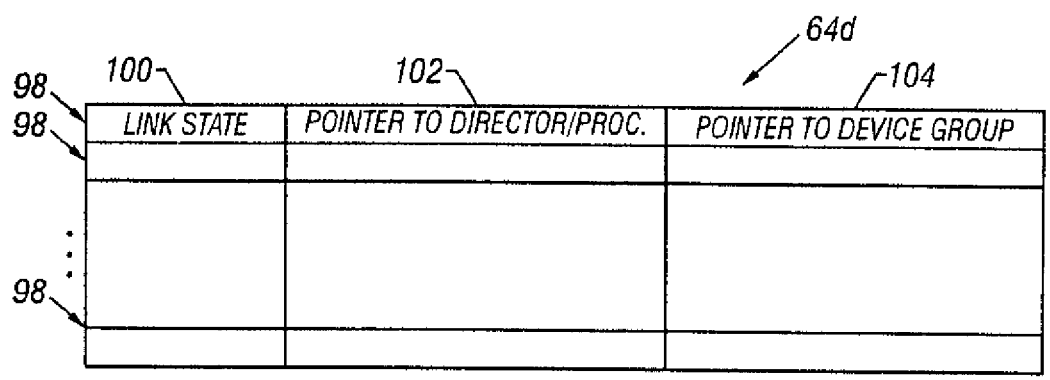

Referring to FIG. 3B, the device groups table includes an entry for each device group 78, that is, 78*a*, 78*b*, . . . 78*k*, that includes the following: a device group name 80; a pointer to a remote storage system that serves the device group 82; a list of device group devices 84 in association with characteristics (including RDF parameters) 86. Referring to FIG. 3C, the processor level table 64*c* includes an entry 90 for each disk director's processor 50, and each entry 90 includes a corresponding name (e.g., WWN, or IP name) 92 and a list of pointers to the device groups supported by the processor 94. Referring to FIG. 3D, the logical links table 96 includes link entries 98. Each includes the following: a link state 100; a pointer to one of the processors 102; and a pointer to one of the device groups 104.

Referring to FIGS. 3A-3D, the tables 64*a*, 64*b* and 64*c* are configured by the system user. The link table 64*d* is generated by the connection initialization and link discovery processes 66 and 68, respectively (of FIG. 2), as will be described.

Figure 4:
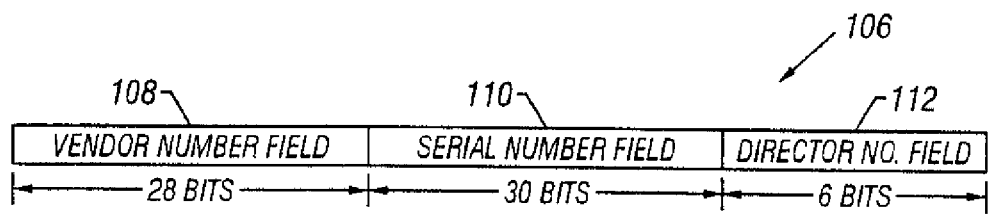
FIG. 4 is a format of a World Wide Name field.

Referring to FIG. 4, an exemplary format of a World Wide Name (WWN) 106 identified in the field 92 of the processors table 64*c* is shown. The WWN 106 provides to each processor that is involved in an RDF configuration a unique name. The WWN 106 includes a vendor-specific vendor number field 108 for identifying the manufacturer of the controller 16, a serial number field 110 for identifying a serial number of the controller 16 and a director number 112 for identifying the port/processor. In the implementation shown, the lengths of the fields 108, 110 and 112 are 28 bits, 30 bits and 6 bits, respectively.

Figure 5:
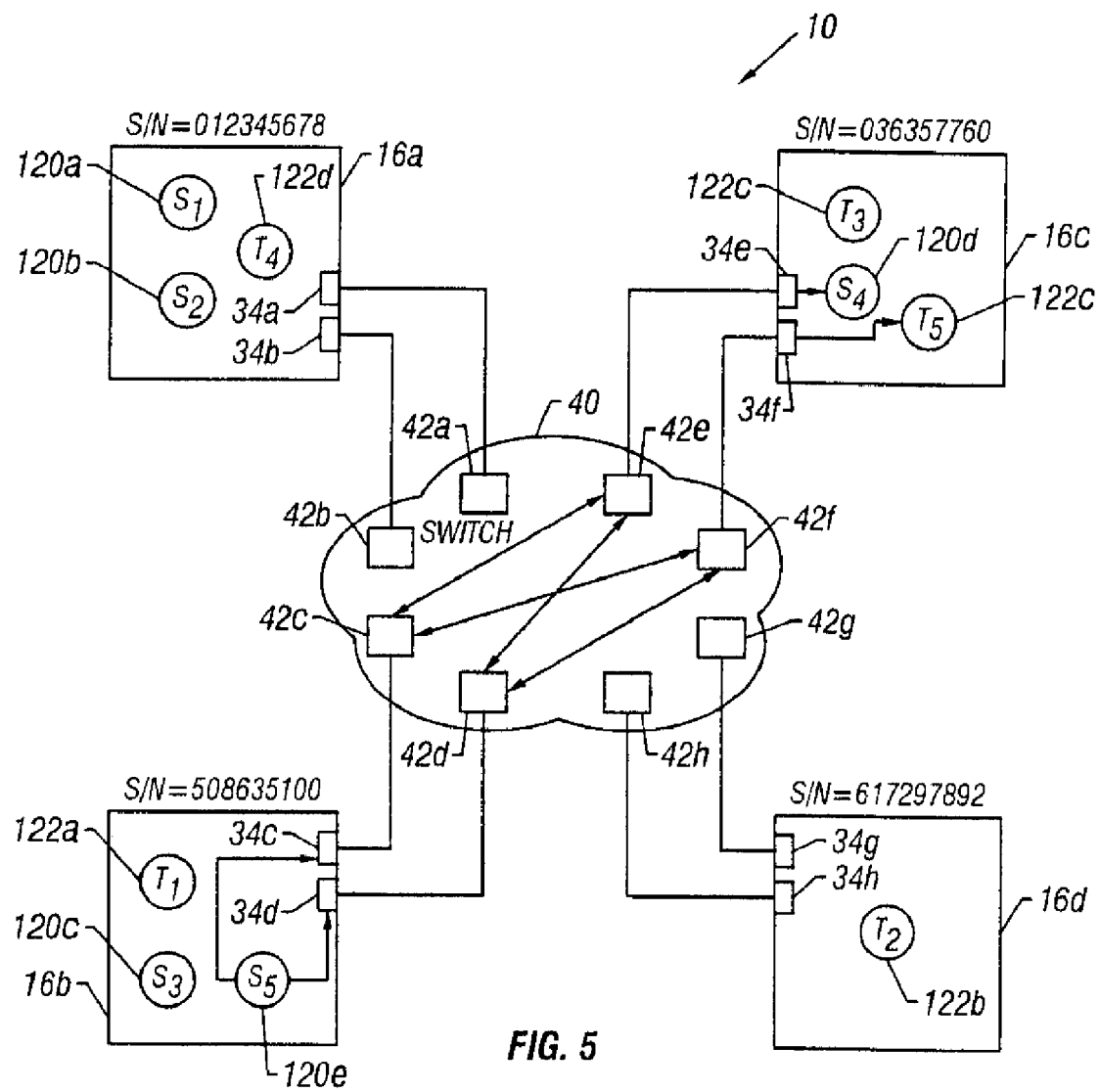
FIG. 5 is a logical depiction of the system of FIG. 1 with an exemplary configuration of controllers configured to support various device groups.

Referring to FIG. 5, an exemplary logical depiction of the system 10 (from FIG. 1) is shown. In this example, there are ten device groups, $S_1$, $S_2$, $S_3$, $S_4$, $S_5$, $T_1$, $T_2$, $T_3$, $T_4$ and $T_5$, which are also indicated by reference numerals 120*a*, 120*b*, 120*c*, 120*d*, 120*e*, 122*a*, 122*b*, 122*c*, 122*d*, and 122*e*, respectively. Five of the device groups, $S_1$ through $S_5$, are source device groups, and device groups $T_1$ through $T_5$ are target device groups. In the example shown, the controllers are configured for remote data mirroring capability in the following manner: the controller 16*a* supports device groups $S_1$, $S_2$ and $T_4$; the controller 16*b* supports device groups $S_3$, $S_5$ and $T_1$; the controller 16*c* supports device groups $S_4$, $T_3$ and $T_5$; and the controller 16*d* supports device group $T_2$. Thus, the devices in source device group $S_1$ on the controller 16*a* are mirrored in devices in corresponding target device group $T_1$ on the controller 16*b*, the devices in $S_2$ (in the controller 16*a*) are mirrored in $T_2$ (in the controller 16*d*), and so forth. Each controller has at its disposal 12 different possible logical links. For example, the controller 16*b* can use its two ports, port 34*c* and 34*d* to achieve the following logical links: port 34*c* to port 34*e*, port 34*c* to port 34*f*, port 34*c* to 34*g*, port 34*c* to port 34*h*, port 34*c* to port 34*a*, port 34*c* to port 34*b*, port 34*d* to port 34*e*, port 34*d* to port 34*f*, port 34*d* to 34*g*, port 34*d* to port 34*h*, port 34*d* to port 34*a* and port 34*d* to port 34*b*. With the particular configuration illustrated in the figure, a port supporting a device group such as $S_3$ needs to be in communication with a port for the corresponding device group, in this case, $T_3$. As shown in the figure, using the switch architecture and the two ports/processors per controller, a connection between two device groups, e.g., $S_3$ and $T_3$, can be achieved with one of four possible logical links: port 34*c* to port 34*e*, port 34*c* to port 34*f*, port 34*d* to port 34*e* and port 34*d* to port 34*f*.

Figure 6:
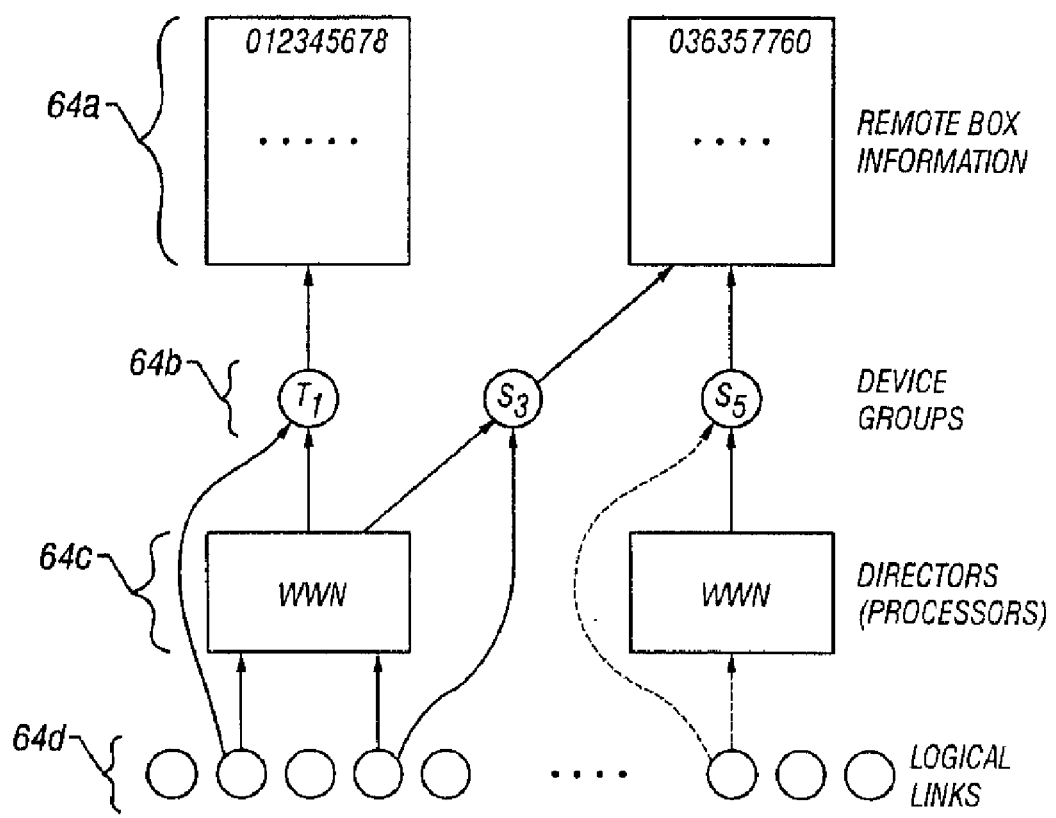
FIG. 6 is a depiction of a configuration topology graph corresponding to the system shown in FIG. 5.

Referring now to FIG. 6, an exemplary topology graph that would be maintained by the controller 16*b* for the system configuration of FIG. 5 is depicted. At the first level, the remote system information 64*a* includes a representation of controllers 16*a* (Serial No. 012345678) and 16*c* (Serial No. 036357760), corresponding to entries in the remote systems table 64*a* (FIG. 3A). The next level shows device group $T_1$ pointing to controller 16*a* because controller 16*a* maintains $S_1$, which is the RDF counterpart for the device group $T_1$. Similarly, device groups $S_3$ and $S_5$ point to the controller 16*c*, as that controller serves these device groups with respective mirrored device groups $T_3$ and $T_5$. These device group representations each correspond to an entry in the device group table 64*b* (FIG. 3B). The next level shows which of the processors (processors associated with ports 34c and 34d) is configured to support which device groups. As represented by the graph (which corresponds to table 64c of FIG. 3C), a processor for one of the directors 32c-32d is configured to support and thus points to device groups $T_1$ and $S_3$. The processor for the other one of the directors 32c-32d is configured to support and thus points to $S_5$. The bottom level shows the various logical links that are established (solid lines/arrows) or are desired (dashed lines/arrows). As shown, logical links are already established for $T_1$ and $S_3$, and the arrows reflect the pointer data stored in the entries of the logical links table 64d (FIG. 3D). For these established links, the link state is active and the state value stored in the field 100 of table 64d is '0xff'.

To establish logical links, such as the one between $S_5$ and $T_5$, a port (more specifically, the associated disk director's processor) needs to execute the connection initialization process 66 and the single link discovery process 68, as will be described below with reference to FIGS. 7 and 8, respectively.

Figure 7:
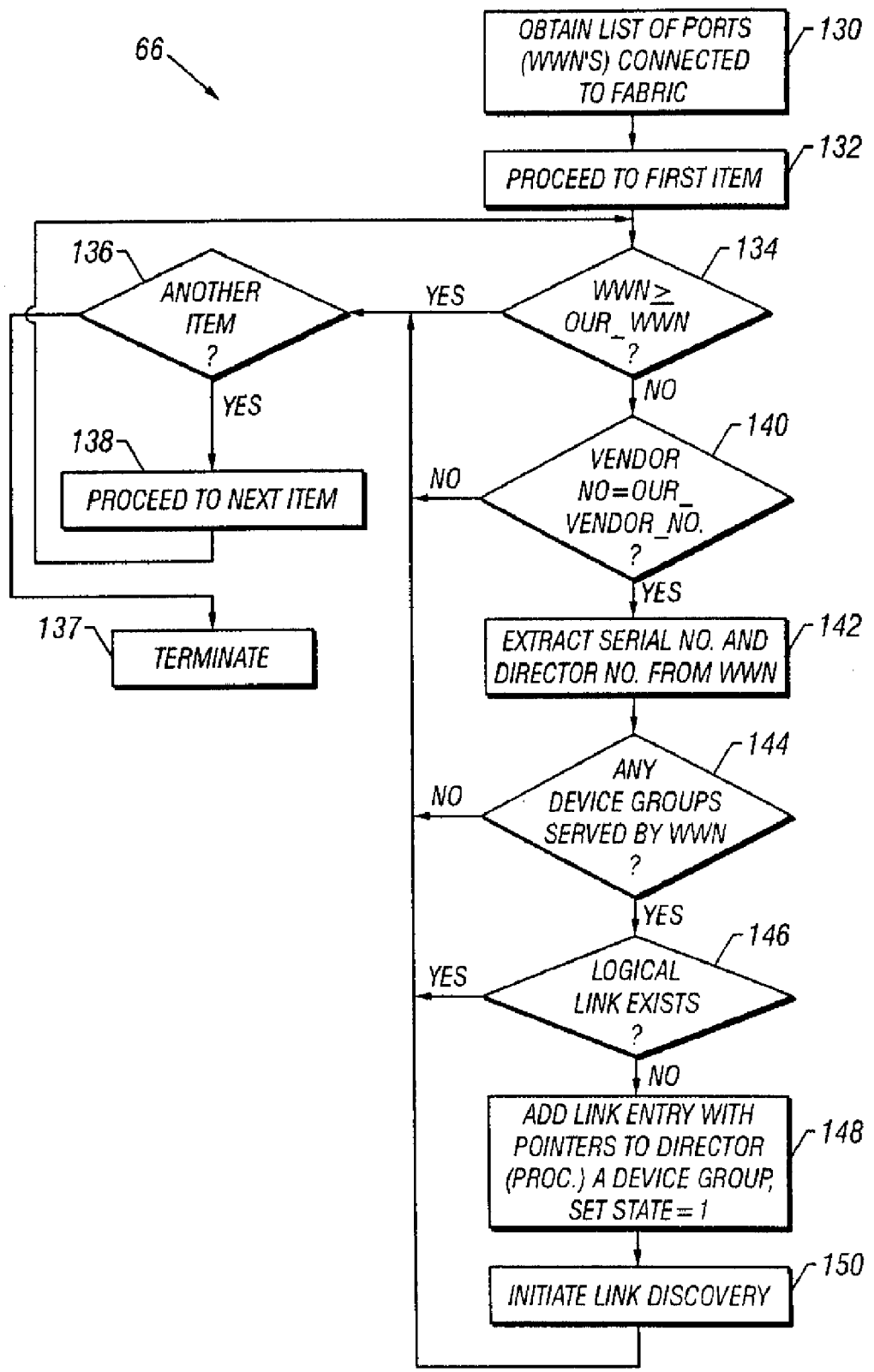
FIG. 7 is a flow diagram of a connection initialization process performed by a processor in a disk director.

Referring to FIG. 7, the connection initialization process 66 (process 66) begins by obtaining from the switch fabric 40 a list of ports connected to the switch fabric 40 (step 130). Preferably, that list includes the World Wide Name for each of those ports. The process 66 proceeds to examine the first item on the list (step 132). The process 66 determines if the WWN of the port is greater than or equal to the WWN of the port on which the process executes, hereinafter, "our_WWN" (step 134). If it is determined that the WWN is greater than or equal to our_WWN, the process 66 determines if there is another item on the list (step 136). If there are no more items on the list, the process 66 terminates (step 137). If there is another item to be examined, the process 66 proceeds to the next item on the list (step 138) and returns to step 134. If the determination at step 134 indicates that WWN is less than our_WWN, the process 66 determines if the vendor number is equal to the vendor number for the port for which the process executes, or "our_vendor_number" (step 140). If it is not, the process 66 ignores that vendor number and proceeds to step 136. If the vendor numbers are the same, the process 66 extracts the serial number and director number from the WWN (step 142). The process 66 determines which, if any, device group is served by the WWN (step 144). That is, it determines if the serial number extracted from the WWN matches the serial number pointed to by any device group. If there is no such match, the process 66 returns to step 136. If there is a match, for each device group served by the serial number, the process 66 performs the following. The process 66 determines if a logical link already exists for the device group and serial number (step 146). If a logical link has already been established, the process 66 returns to step 136. If no logical link exists, the process 66 adds a link to the link table by setting the state equal to one and adding pointers that point to a device group served by the matched serial number and the processor that points to that device group (step 148). The process 66 initiates the single link discovery process 68 to establish a link to the remote processor identified by the WWN director number (step 150). The process 66 then returns to step 136. Thus, the process 66 performs steps 134 through 150 for each port represented on the list. The process 66 is performed as a background process and is repeated in accordance with a timing parameter set in the parameter store 58 (FIG. 2).

Figure 8:
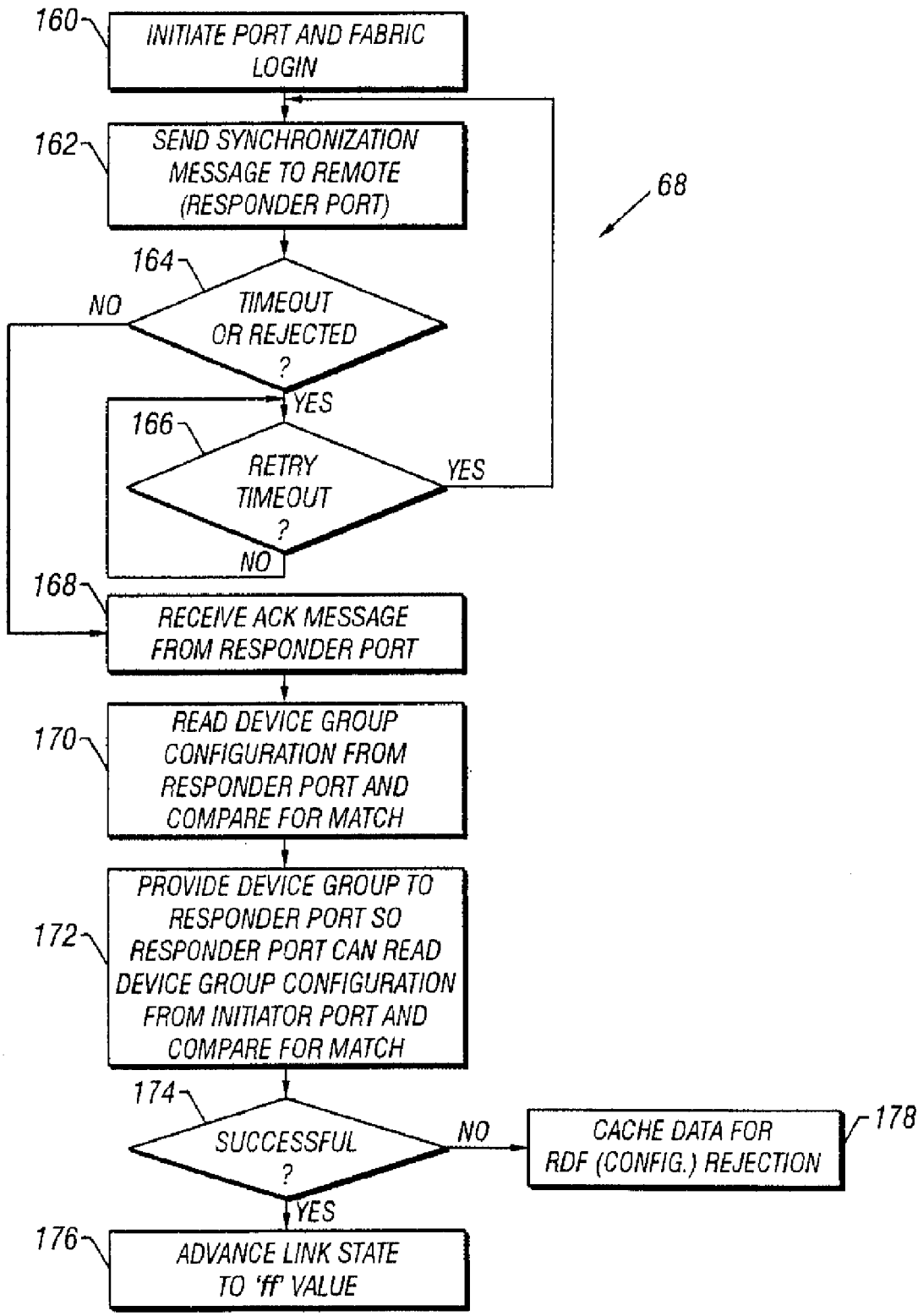
FIG. 8 is a flow diagram of a single link discovery process performed by a processor in a disk director.

Referring to FIG. 8, a detailed flow of the single link discovery process 68 (process 68) is shown. The process 68 initiates a login process for the port that is initiating the link discovery (initiator port) and the fabric (step 160). In the described embodiment for a FC switch, the login is performed using known FC login techniques. The process 68 of the initiator port initiates contact with the remote (responder) port by sending a synchronization message to the responder port (step 162). Synchronization may be achieved in this manner by resetting the responder port. If a timeout occurs prior to receiving a response or the link attempt is rejected by the fabric because the link from the fabric to the responder port is has failed (step 164), the process 68 retries synchronization after a predetermined retry delay has occurred (step 166). Otherwise, a response is received from the responder port and the synchronization message causes the responder port to perform its own FC login, as well as create a link entry for the port with a link state value of one as part of its own link discovery process (step 168). The initiator port reads the configuration information for the device group pointed to by the remote port and compares it to the configuration for the device group (step 170). It provides the device group to the responder port, which causes the responder group to determine if it supports the device group by reading the configuration data for the initiator port's device group and comparing it to configuration information stored for the remote device group (step 172). If the process does not detect or receive indication of a mismatch, that is the link discovery is successful (step 174), it causes the initiator port to advance its link state to a an '0xxff' value (step 176). Alternatively, if the process 68 determines that link discovery is unsuccessful due to an RDF mismatch/rejection, the process 68 caches the information about the failure (notes the WWN of the remote port) so that the process 68 can avoid repeating attempts to establish a connection that cannot be established due to configuration limitations or mismatches (step 178).

Thus, during a single link discovery, the process 68 causes the state machines in both the initiator and responder ports to attempt to advance their state from '1' to '0xff' with four possible results: 'ff' (link established); timeout (fail) with retry; "link down" rejection; or RDF rejection. The link is successfully established when both state machines have advanced the link state to 'ff'.

It will be appreciated that numerous other modifications may be made in connection with the invention. The controllers 16 may further support a mirror service policy which identifies which disk directors in conjunction with the storage devices that they control are primarily responsible for satisfying requests from a host computer. This policy could be fixed at the beginning of a system set up, taking into account the expected loads. Preferably, however, the mirror service policy implementation is dynamic. That is, the mirror service policy can be modified, periodically, in response to statistics describing the nature of the read and write requests to the data storage system 12, to change the mirror service policy during the operation of the data storage system 12. An example of a dynamic mirror service policy (DMSP) is described in U.S. Pat. No. 6,112,257.

Additions, subtractions, and other modifications of the preferred embodiments of the invention will be apparent to those practiced in this field and are within the scope of the following claims.

What is claimed is:

1. In a remote data mirroring arrangement of data storage systems, a method of connecting ports on a data storage system to ports on other data storage systems comprising:

providing each storage system with configuration topology information;

determining from a switch fabric that connects to ports of all of the data storage systems information identifying ports of the other data storage systems connected to the switch fabric; and using the configuration topology information and the information obtained from the switch fabric to determine if a logical link already exists between a port on the storage system and a second port on a second storage system and establish a logical link if no logical link exists so that data residing on a device group supported by the port and a corresponding, mirrored device group supported by the second port can be exchanged between the data storage system and the second data storage system.

2. The method of claim 1, wherein the configuration topology information comprises configuration topology tables.

3. The method of claim 2, wherein the configuration topology tables further comprise a device groups table identifying the device groups supported by the data storage system and providing for each of the device groups a pointer to one of the other data storage systems that serves the device group.

4. The method of claim 3, wherein the configuration topology tables further comprise a remote systems table specifying by serial number each one of the other data storage systems that is pointed to by the pointer in the device groups table.

5. The method of claim 4, wherein the configuration topology tables further comprise a processors table identifying by a unique name each processor in the data storage system and providing an associated pointer to any one or more of the device groups supported by such processor.

6. The method of claim 5, wherein determining comprises:

receiving from the switch fabric a list of the ports of the other data storage systems, the list including for each of the ports a corresponding World Wide Name, the World Wide Name including unique names for processors and a serial number for the data storage system with which the port is associated.

7. The method of claim 6, wherein using comprises:
determining if any of the device groups are served by the World Wide Name.

8. The method of claim 7, wherein using further comprises:

determining if a serial number of one of the storage systems pointed to by any of the device groups matches the serial number included in the World Wide Name;

if a match exists, reading the unique processor name that is associated with the pointer that points to the matched device group; and writing to a new link entry in a link table pointers to the unique processor name and the device group as well as a state value of one.

9. The method of claim 8, wherein using further comprises:

performing a single link discovery for the port and the port having the World Wide Name.

10. The method of claim 9, wherein the ports are state machines and wherein the single link discovery establishes the logical link when each of the state machines advances to a '0xFF' state from a '1' state.

11. The method of claim 10, wherein performing the single link discovery comprises exchanging between the ports data from the respective configuration topology tables of the ports to determine if the data matches.

12. The method of claim 1, wherein the switch fabric comprises a Fibre Channel switch fabric.

13. A method of connecting a port of a data storage system to ports of other data storage systems through a switch fabric in a remote data mirroring arrangement, comprising:

using configuration topology information provided to the data storage system and information obtained from the switch fabric identifying ports of the other data storage systems connected to the switch fabric to determine if a logical link already exists between a port on the storage system and a second port on a second storage system connected to the switch fabric and establish a logical link if no logical link exists so that data residing on a device group supported by the port and a corresponding, mirrored device group supported by the second port can be exchanged between the data storage system and the second data storage system.

14. In a remote, mirrored arrangement of data storage systems connected through a switch fabric, a data storage system comprising:

a port responsive to configuration topology information and to information received from the switch fabric identifying ports of other data storage systems connected to the switch fabric to determine if a logical link already exists between the port and a second port on a second data storage system connected to the switch fabric and establish a logical link if no logical link exists so that data residing on a device group supported by the port of the data storage system and a corresponding, mirrored device group supported by the second port can be exchanged between the data storage system and the second data storage system.

* * * * *

UNITED STATES PATENT AND TRADEMARK OFFICE
CERTIFICATE OF CORRECTION

PATENT NO. : 7,383,385 B2 Page 1 of 1
APPLICATION NO. : 11/627000
DATED : June 3, 2008
INVENTOR(S) : David Meiri et al.

It is certified that error appears in the above-identified patent and that said Letters Patent is hereby corrected as shown below:

Title Page, item (75) Inventors:, delete "Kamvysselisi," and replace with

-- Kamvysselis, --.

Col. 1, line 22, delete "Once" and replace with -- One --.

Col. 2, line 45, delete "minoring" and replace with -- mirroring --.

Col. 2, line 49, delete "minoring" and replace with -- mirroring --.

Col. 4, line 2, delete "ORDF)." and replace with -- "RDF"). --.

Col. 4, line 47, delete "FP 40b, FP 40c, FP 40c, FP 40d, FP 40e, EP 40f, FP 40g and"

and replace with -- FP 40b, FP 40c, FP 40d, FP 40e, FP 40f, FP 40g and --.

Col. 4, line 55, delete "minored" and replace with -- mirrored --.

Col. 5, line 10-11, delete "a system data" and replace with -- a data --.

Col. 5, line 17, delete "minored" and replace with -- mirrored --.

Col. 6, line 40, delete "port 34c and 34d" and replace with -- port 34c and port 34d --.

Col. 8, line 10, delete "port is has" and replace with -- port has --.

Col. 8, line 28, delete "a an 'OXxff'" and replace with -- a 'Oxff' --.

Signed and Sealed this

Twenty-sixth Day of August, 2008

JON W. DUDAS
*Director of the United States Patent and Trademark Office*